Figure 1:
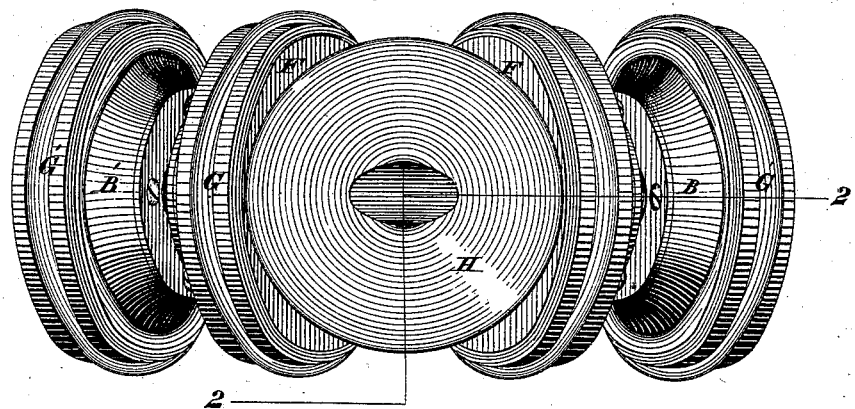

E. GRAY.
Electric Telephone.

No. 224,013. Patented Feb. 3, 1880.

WITNESSES
Wm A Skinkle
Geo. W. Breck.

INVENTOR
Elisha Gray
By his Attorneys
Baldwin, Hopkins & Peyton

UNITED STATES PATENT OFFICE.

ELISHA GRAY, OF CHICAGO, ILLINOIS.

ELECTRIC TELEPHONE.

SPECIFICATION forming part of Letters Patent No. 224,013, dated February 3, 1880.

Application filed May 8, 1878.

*To all whom it may concern:*

Be it known that I, ELISHA GRAY, of Chicago, in the county of Cook and State of Illinois, have invented certain new and useful improvements in the art of generating, transmitting, and reproducing rhythmical vibrations representing spoken words or vocal sounds in an electric circuit, and in apparatus for so generating, transmitting, and reproducing such vibrations, of which improvements the following is a specification.

My present invention more especially relates to and constitutes an improvement upon my "bi-polar" telephone, for which Letters Patent of the United States No. 204,029 were granted to me May 21, 1878. That patent shows two telephones so combined with a bifurcated mouth-piece that each is actuated with equal force, thereby greatly increasing the electro-motive force which generates the rhythmical vibrations representing the vocal sounds or words articulated or spoken into the telephone.

The object of my present invention is still further to increase the electro-motive force or rhythmical generating capacity of the telephone and to secure an increased volume and clearness of sound, while preserving the portable features of the instrument, so as to enable it to be handled with facility; to which ends my improvement consists, first, in a novel art, method, or system of producing rhythmical vibrations representing spoken words or articulate sounds in a secondary diaphragm and its magnet by the movements of a primary diaphragm, the electro-motive force of the secondary diaphragm and its magnet being thus superposed upon or combined with that of the primary diaphragm and its magnet, thereby obtaining additional amplitude of vibration; second, in a novel art, method, or system of generating in an electric circuit rhythmical vibrations representing spoken words or articulate sounds by the conjoint action of a primary diaphragm and its magnet and a second diaphragm (actuated by the primary diaphragm) and its magnet, transmitting such vibrations through an electric circuit, and reproducing them at the receiving end of the line; third, in a novel art, method, or system of producing rhythmical vibrations representing spoken words or articulate sounds in a series of primary diaphragms and a series of secondary diaphragms and their magnets from a common mouth-piece, whereby greater volume of sound is obtained.

My invention further consists in combining two diaphragms and an interposed air-chamber so that one diaphragm is vibrated by air-waves generated by the other.

My invention further consists in combining two diaphragms, an interposed tubular magnet, and an air-chamber, whereby the vibrations of one diaphragm are communicated to the other through the air-chamber and both diaphragms act upon the same magnet.

The accompanying drawings represent so much of my improved apparatus as is necessary to illustrate the subject-matter herein claimed as constructed in the best way now known to me. Obviously, however, some of the improvements may be used without the others and in apparatus differing somewhat in its details of construction from those of that herein shown without departing from the spirit of my invention.

Figure 2:
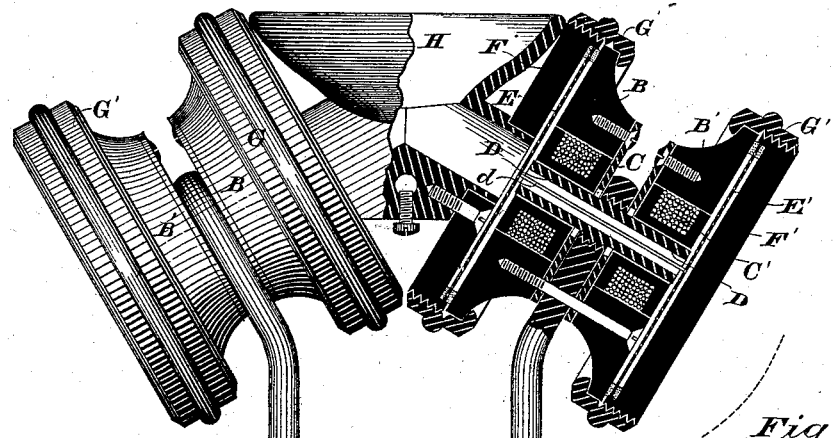
Figure 3:
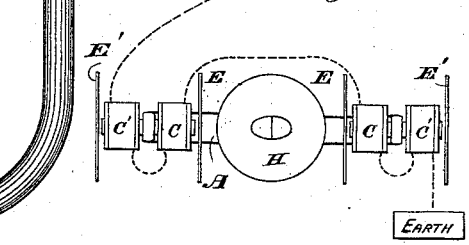

Figure 1 represents a plan or top view of a bi-polar telephone with its diaphragms and electro-magnets duplicated and arranged in reverse order on each side of each of the poles of its permanent magnet. Fig. 2 represents a side elevation, partly in section, therethrough on the line 2 2 of Fig. 1, showing the details of the method of constructing and connecting each pair of diaphragms. Fig. 3 represents the arrangement upon circuit of my improved apparatus.

The details of construction of the present apparatus are substantially the same as those of my bi-polar telephone hereinbefore mentioned, and my improved instrument embodies all that is therein shown, with certain additions hereinafter mentioned.

The apparatus may be used as a transmitter in combination with any of the ordinary known telephones.

The instrument shown in the drawings consists, essentially, of a permanent horseshoe or U shaped steel magnet, A, (which constitutes the handle of the instrument, and may be highly ornamented or polished,) soft-iron cores D, helices C C', diaphragms E E', rubber disks B B', screw-caps F F', clamp-rings G, and a bifurcated mouth-piece, H.

The soft-iron core D is made tubular, and extends through the pole of the permanent magnet on each side, so as to receive a supplementary helix or wire coil, C', in addition to the usual one on the opposite side of the pole.

A secondary diaphragm, E', is mounted in front of the supplementary electro-magnet in precisely the same manner as its corresponding diaphragm, E. The arrangement of the secondary magnet and its diaphragm relatively to the pole is, however, it will be observed, reversed, so as to bring the electro-magnets next the pole and between the diaphragms.

The secondary cap F, which protects the diaphragm E', is made solid—that is, it has no opening for a mouth-piece, such construction being unnecessary in this instance.

The core D has a small hole drilled through it from end to end, about one-eighth of an inch in diameter. A light rod, d', of wood or some non-magnetic metal, (such as brass, for instance,) passes through this opening, in which it is capable of moving freely endwise. Each end of this rod is attached to its respective diaphragm E E', so that the movement of one from any cause whatever produces corresponding movements or vibrations in the other.

Another mode of producing substantially the same effect, of vibrating one diaphragm by the other, at least in kind if not in degree, is to omit the connecting-rod d, in which case the secondary diaphragm would be actuated by the vibrations of the column of air contained in the hollow core D. It should be observed that this hollow core, in connection with the space between the diaphragms, forms an air-tight chamber.

The obvious advantage of my improvement is that I am enabled, under the organization of parts above described, to vibrate two diaphragms in front of two electro-magnets, both of which are charged from the same pole of the permanent magnet, without making any change in any respect in the bifurcated mouth-piece shown in my bi-polar patent above mentioned.

I have demonstrated by experience that by this method I can generate much greater electro-motive force than could be done by the employment of a single diaphragm, and am consequently enabled to produce a much louder and clearer sound.

A similar apparatus is attached to the other pole of the permanent magnet, and I am thus enabled to vibrate four diaphragms instead of two, as in my bi-polar telephone above mentioned, and still retain the same relation between the diaphragms and mouth-piece as in the aforesaid instrument.

The arrangement upon circuit which I deem most advantageous is one which keeps all the magnets permanently charged, which is preferably done (where a permanent magnet is not used) by working with what is known as a "closed circuit," such as that shown in Letters Patent of the United States No. 186,340, granted to me January 16, 1877, or in two applications for Letters Patent of the United States, respectively filed by me October 29, 1877, (Case 1,) and January 17, 1878.

The operation of the apparatus will readily be understood from the foregoing description.

The particular organizations of instrumentalities hereinbefore described for carrying out the objects of my invention are not herein claimed, as they constitute the subject-matter of another application (a division hereof) filed June 20, 1878.

I claim as my invention—

1. The hereinbefore-described art of producing or generating rhythmical vibrations representing articulate sounds or spoken words in a secondary diaphragm and its magnet by the movements of a primary diaphragm.

2. The hereinbefore-described art of generating in an electric circuit rhythmical vibrations representing spoken words or articulate sounds by actuating a secondary diaphragm by the movements of a primary diaphragm, transmitting such vibrations through electro-magnets included in an electric circuit, and reproducing them at the receiving end of the line.

3. The hereinbefore-described art of producing rhythmical vibrations in a series of primary diaphragms and a series of secondary diaphragms and their magnets from a common mouth-piece.

4. In combination, two diaphragms and an interposed air-chamber, whereby the vibrations of one diaphragm are communicated to the other through the air inclosed in said chamber.

5. In combination, two diaphragms, an interposed tubular magnet, and an air-chamber, whereby the vibrations of one diaphragm are communicated to the other through the air-chamber and both diaphragms act upon the same magnet.

In testimony whereof I have hereunto subscribed my name.

ELISHA GRAY.

Witnesses:
 A. G. SWARTWOUT,
 D. M. ERSKINE, Jr.